(12) United States Patent
Gunatilake et al.

(10) Patent No.: US 8,938,393 B2
(45) Date of Patent: Jan. 20, 2015

(54) EXTENDED VIDEOLENS MEDIA ENGINE FOR AUDIO RECOGNITION

(75) Inventors: Priyan Gunatilake, San Diego, CA (US); Djung Nguyen, San Diego, CA (US); Abhishek Patil, San Diego, CA (US); Dipendu Saha, San Diego, CA (US)

(73) Assignee: Sony Corporation, Tokyo (JP)

(*) Notice: Subject to any disclaimer, the term of this patent is extended or adjusted under 35 U.S.C. 154(b) by 520 days.

(21) Appl. No.: 13/171,246

(22) Filed: Jun. 28, 2011

(65) Prior Publication Data
US 2013/0006625 A1    Jan. 3, 2013

(51) Int. Cl.
| | | |
|---|---|---|
| G10L 21/00 | (2013.01) | |
| G10L 15/00 | (2013.01) | |
| G10L 17/00 | (2013.01) | |
| H04N 7/18 | (2006.01) | |
| G06F 17/30 | (2006.01) | |
| G06F 3/00 | (2006.01) | |
| G10L 17/08 | (2013.01) | |
| G10L 15/26 | (2006.01) | |
| H04N 21/439 | (2011.01) | |
| H04N 21/84 | (2011.01) | |
| G10L 25/81 | (2013.01) | |

(52) U.S. Cl.
CPC .............. G10L 17/08 (2013.01); G10L 15/26 (2013.01); H04N 21/4394 (2013.01); H04N 21/84 (2013.01); G10L 25/81 (2013.01)
USPC ............. 704/270; 704/246; 704/251; 348/61; 707/736; 715/723

(58) Field of Classification Search
None
See application file for complete search history.

(56) References Cited

U.S. PATENT DOCUMENTS

| | | | |
|---|---|---|---|
| 6,377,995 B2 * | 4/2002 | Agraharam et al. | 709/231 |
| 6,400,652 B1 * | 6/2002 | Goldberg et al. | 369/7 |

(Continued)

FOREIGN PATENT DOCUMENTS

| | | |
|---|---|---|
| CN | 1352450 A | 6/2002 |
| CN | 1703694 A | 11/2005 |

OTHER PUBLICATIONS

Bugalho et al; "Detecting Audio Events for Semantic Video Search"; Interspeech; pp. 1151-1154; 2009.

(Continued)

Primary Examiner — Brian Albertalli
(74) Attorney, Agent, or Firm — Fitch, Even, Tabin & Flannery LLP

(57) ABSTRACT

A system, method, and computer program product for automatically analyzing multimedia data audio content are disclosed. Embodiments receive multimedia data, detect portions having specified audio features, and output a corresponding subset of the multimedia data and generated metadata. Audio content features including voices, non-voice sounds, and closed captioning, from downloaded or streaming movies or video clips are identified as a human probably would do, but in essentially real time. Particular speakers and the most meaningful content sounds and words and corresponding time-stamps are recognized via database comparison, and may be presented in order of match probability. Embodiments responsively pre-fetch related data, recognize locations, and provide related advertisements. The content features may be also sent to search engines so that further related content may be identified. User feedback and verification may improve the embodiments over time.

16 Claims, 13 Drawing Sheets

(56) References Cited

U.S. PATENT DOCUMENTS

| | | | |
|---|---|---|---|
| 6,400,996 B1 | 6/2002 | Hoffberg | |
| 6,496,228 B1 | 12/2002 | McGee et al. | |
| 6,925,197 B2* | 8/2005 | Dimitrova et al. | 382/118 |
| 7,003,515 B1 | 2/2006 | Glaser et al. | |
| 7,047,494 B2 | 5/2006 | Wu et al. | |
| 7,082,255 B1 | 7/2006 | Jun | |
| 7,110,047 B2 | 9/2006 | McGee et al. | |
| 7,181,757 B1 | 2/2007 | Kim et al. | |
| 7,212,666 B2 | 5/2007 | Zhang et al. | |
| 7,240,003 B2* | 7/2007 | Charlesworth et al. | 704/254 |
| 7,260,564 B1 | 8/2007 | Lynn et al. | |
| 7,295,752 B1 | 11/2007 | Jain et al. | |
| 7,302,451 B2* | 11/2007 | Radhakrishnan et al. | 1/1 |
| 7,334,078 B2* | 2/2008 | Parry et al. | 711/100 |
| 7,349,477 B2 | 3/2008 | Divakaran et al. | |
| 7,424,204 B2 | 9/2008 | Nakamura | |
| 7,571,051 B1 | 8/2009 | Shulman | |
| 7,627,823 B2 | 12/2009 | Takahashi et al. | |
| 7,668,369 B2 | 2/2010 | Yen et al. | |
| 7,676,820 B2 | 3/2010 | Snijder et al. | |
| 7,697,785 B2 | 4/2010 | Chiu et al. | |
| 7,734,568 B2 | 6/2010 | Polson et al. | |
| 7,739,601 B1 | 6/2010 | Wong | |
| 7,769,827 B2 | 8/2010 | Girouard et al. | |
| 7,826,675 B2 | 11/2010 | Kisilev | |
| 8,514,197 B2* | 8/2013 | Shahraray et al. | 345/173 |
| 2001/0044719 A1* | 11/2001 | Casey | 704/245 |
| 2002/0069218 A1 | 6/2002 | Sull et al. | |
| 2002/0147782 A1 | 10/2002 | Dimitrova | |
| 2003/0093790 A1 | 5/2003 | Logan | |
| 2003/0098869 A1 | 5/2003 | Arnold | |
| 2003/0107592 A1* | 6/2003 | Li et al. | 345/745 |
| 2003/0115047 A1* | 6/2003 | Mekuria | 704/219 |
| 2004/0013405 A1 | 1/2004 | Christiansen | |
| 2004/0130567 A1 | 7/2004 | Ekin | |
| 2004/0223052 A1 | 11/2004 | Sugano et al. | |
| 2005/0102135 A1* | 5/2005 | Goronzy et al. | 704/213 |
| 2005/0234985 A1 | 10/2005 | Gordon et al. | |
| 2006/0274201 A1* | 12/2006 | Lim | 348/512 |
| 2007/0150517 A1 | 6/2007 | Malone | |
| 2008/0008397 A1 | 1/2008 | Kisilev | |
| 2008/0071749 A1 | 3/2008 | Schloter | |
| 2008/0072261 A1 | 3/2008 | Ralston | |
| 2008/0086688 A1 | 4/2008 | Chandratillake | |
| 2008/0097970 A1 | 4/2008 | Olstad et al. | |
| 2008/0209330 A1 | 8/2008 | Cruver | |
| 2008/0209484 A1* | 8/2008 | Xu | 725/105 |
| 2008/0222120 A1 | 9/2008 | Georgis et al. | |
| 2008/0229357 A1 | 9/2008 | Candelore et al. | |
| 2008/0267504 A1 | 10/2008 | Schloter | |
| 2008/0270569 A1 | 10/2008 | McBride | |
| 2009/0022472 A1 | 1/2009 | Bronstein et al. | |
| 2009/0025039 A1 | 1/2009 | Bronstein et al. | |
| 2009/0210395 A1 | 8/2009 | Sedam | |
| 2009/0328102 A1 | 12/2009 | Morris et al. | |
| 2010/0076996 A1* | 3/2010 | Hu et al. | 707/771 |
| 2010/0082585 A1 | 4/2010 | Barsook | |
| 2010/0103173 A1 | 4/2010 | Lee | |
| 2010/0111489 A1 | 5/2010 | Presler | |
| 2010/0235313 A1* | 9/2010 | Rea et al. | 706/52 |
| 2010/0303288 A1 | 12/2010 | Malone | |
| 2010/0315506 A1 | 12/2010 | Liu | |
| 2010/0319015 A1* | 12/2010 | Remington | 725/19 |
| 2011/0047163 A1 | 2/2011 | Chechik | |
| 2011/0075851 A1* | 3/2011 | LeBoeuf et al. | 381/56 |
| 2011/0082696 A1* | 4/2011 | Johnston et al. | 704/243 |
| 2011/0113461 A1 | 5/2011 | Laganiere | |
| 2011/0244919 A1 | 10/2011 | Aller | |
| 2011/0246483 A1 | 10/2011 | Darr | |
| 2012/0010884 A1 | 1/2012 | Kocks | |
| 2012/0110455 A1 | 5/2012 | Sharma | |
| 2014/0040222 A1* | 2/2014 | Schmitz et al. | 707/705 |

OTHER PUBLICATIONS

Chen et al; "Incorporating Audio Clues Into Dialog and Action Scene Extraction"; Electronic Imaging 2003; pp. 252-263; International Society for Optics and Photonics; 2003.

Final office action from U.S. Appl. No. 13/171,207 mailed Sep. 11, 2013.

Gunatilake; U. S. Appl. No. 13/171,207, filed Jun. 28, 2011.

Gunatilake; U.S. Appl. No. 14/289,942, filed May 29, 2014.

Gunatilake; U.S. Appl. No. 13/171,176, filed Jun. 28, 2011.

Gunatilake; U.S. Appl. No. 13/171,223, filed Jun. 28, 2011.

Huang et al; "Integration of Audio and Visual Information for Content-Based Video Segmentation"; Image Processing; ICIP 98; pp. 526-529; 1998 International Conference; IEEE; 1998.

Non-final office action for U.S. Appl. No. 13/171,207 mailed Oct. 1, 2012.

Non Final Office Action from U. S. Appl. No. 13/171,223 mailed Dec. 20, 2012.

Patel et al; "Video Classification Using Speaker Identification"; Storage and Retrieval for Image and Video Databases (SPIE); pp. 218-225; 1997.

USPTO: Notice of Allowance issued in U.S. Appl. No. 13/171,176 mailed Jul. 16, 2014.

USPTO: Non-Final Office Action for U. S. Appl. No. 13/171,223 mailed Feb. 10, 2014.

USPTO: Notice of Allowance from U.S. Appl. No. 13/171,207 mailed Feb. 10, 2014.

USPTO: Notice of Allowance issued in U.S. Appl. No. 13/171,207 mailed Apr. 14, 2014.

USPTO; Advisory Action issued in U.S. Appl. No. 13/171,223 mailed Sep. 19, 2013.

USPTO; Final Office Action issued in U.S. Appl. No. 13/171,223 mailed Jul. 5, 2013.

USPTO; Non-final office action for U.S. Appl. No. 13/171,176 mailed Jan. 30, 2014.

USPTO; Notice of Allowance and Examiner-Initiated Interview Summary issued in U.S. Appl. No. 13/171,223, mailed May 19, 2014.

USPTO; Office Action issued in U.S. Appl. No. 13/171,223, mailed Dec. 20, 2012.

USPTO; Restriction Requirement issued in U.S. Appl. No. 13/171,176, mailed Sep. 20, 2013.

USPTO; Notice of Allowance issued in U.S. Appl. No. 13/171,207 mailed Aug. 12, 2014.

Notification of First Office Action for Chinese Patent Application No. 201210206001.2 mailed by the State Intellectual Property Office of the People's Republic of China on Oct. 29, 2014.

* cited by examiner

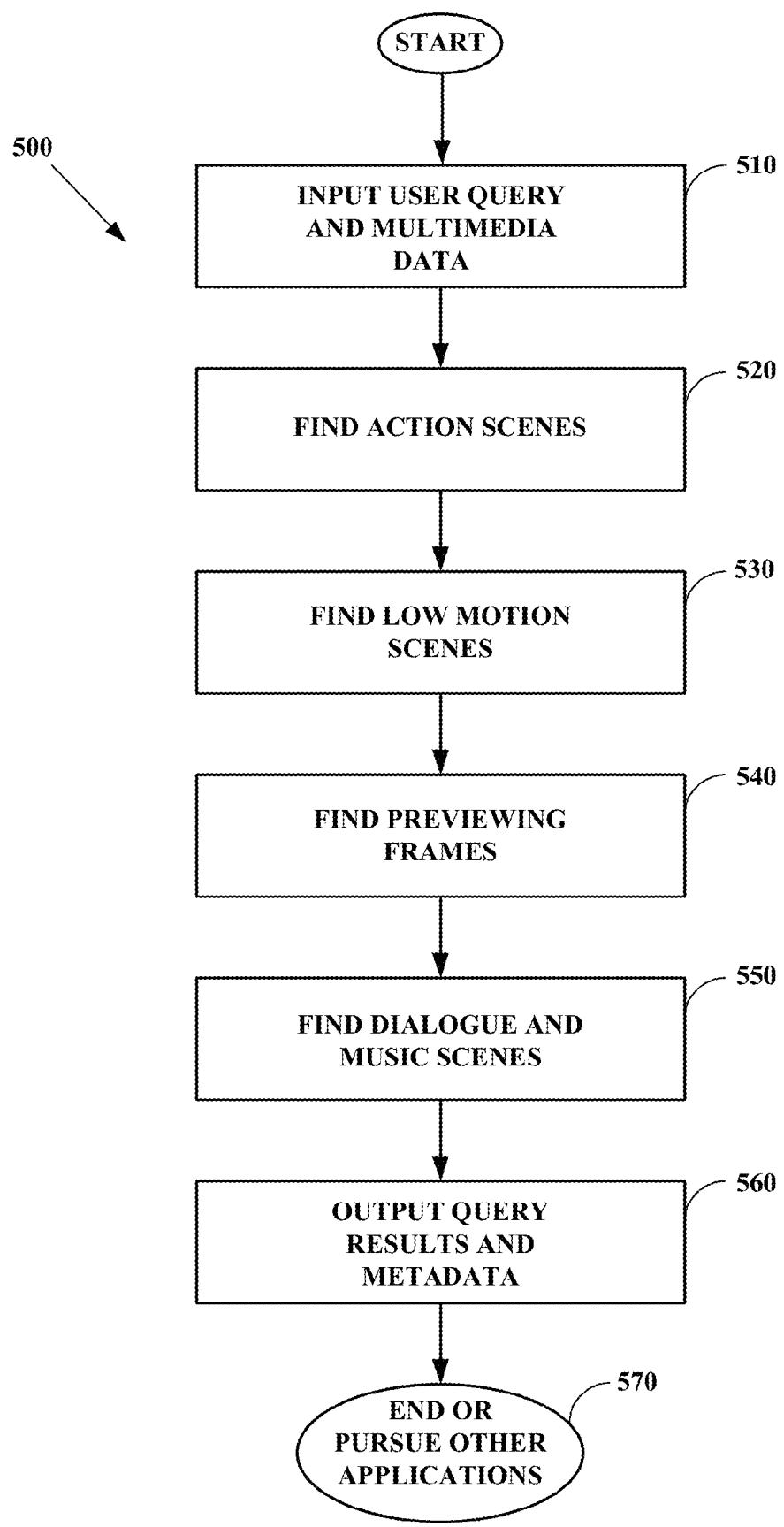

EXTENDED VIDEOLENS MEDIA ENGINE FOR AUDIO RECOGNITION

CROSS-REFERENCE TO RELATED APPLICATIONS

This application is related by subject matter to three other applications including U.S. application Ser. No. 13/171,176 entitled "VideoLens Media Engine", filed Jun. 28, 2011, U.S. application Ser. No. 13/171,207 entitled "Adaptable Video-Lens Media Engine", filed Jun. 28, 2011, and U.S. application Ser. No. 13/171,223 entitled "VideoLens Media System for Feature Selection", filed Jun. 28, 2011, each of which is hereby incorporated by reference in its entirety.

FIELD OF THE INVENTION

This patent application relates in general to managing multimedia data, and more specifically to collecting, categorizing, summarizing, editing, tagging, sharing, and performing directed searching and advertising based on selected multimedia audio content.

BACKGROUND OF THE INVENTION

The growth of online video is truly remarkable. Comscore estimates that over 75% of US internet users view online video. They spend an average of 235 minutes per month accounting for a total of 5 billion videos watched.

The content type typically determines the viewing experience. For example, premium content offers a rich and interactive viewing experience to the user. Metadata that accompanies the content such as story summary, cast and director profiles, ratings, user comments and chaptering contribute to the overall experience. Premium content available on the web is usually purchased, and is typically 30 minutes or longer in duration.

In contrast, free content is mostly user generated and offers a "no frills" viewing experience. Text, occasional thumbnails, user ratings and links are part of this viewing experience. Viewing is typically restricted to "start-to-end" playback with "blind" seeking (no visual guidance to content). The average length of a free content stream is 1-5 minutes, with Comscore estimating the average duration of an online video to be 2.9 minutes.

Given that the vast majority of online content is free (and user generated), there is a growing need to improve the current "no frills" viewing experience of free content.

The enhancement of the online video experience is a goal shared by many. As a result, many solutions have been developed. The solution of choice for premium content is metadata. Metadata is information related to content that can appear as text, images, video or audio to provide story summary, actor and director profiles, deleted scenes and chaptering that allows customized playback. Additionally, metadata is complemented by related links, user comments and ratings. Metadata adds a descriptive and interactive layer to content playback. Content creators, distributors, and companies in between have recognized its value, and have made metadata an integral part of the premium content offering.

Unfortunately, the metadata creation process for premium content does not scale for free content, due to its dependency on manual creation. Manual processing of user generated free content is an economically unrealistic proposition, so automated methods are needed. These methods may act on audio and video aspects of the content to extract meaningful information. They can be thought of as producing machine-generated metadata.

The automated methods fall into one of three categories—audio/video analysis, codec technology and industry standards.

The category that has received the most attention from academia is audio/video analysis. These methods analyze the audio and video data of the content and attempt to extract key information that is meaningful to the user. Compressed domain video analysis, motion analysis, object segmentation, text detection, spectrum analysis and speech to text conversions are some techniques used to extract key information. Most methods provide good accuracy, but their complexity limits use in real-time applications and on resource-constrained consumer devices. Therefore, most audio/video analysis is performed offline.

Codec technology offers an alternative automated metadata generation process for free content. In this case, key information regarding the content is encapsulated within the compressed stream during the encoding process. The playback process extracts and presents them alongside the content. Codec standards such MPEG2, MPEG4-Part 2, AVC (H.264), VCI and other advanced codecs define special profiles to support this capability. Unfortunately, this method adds a high degree of complexity to the encoding and decoding process, which has restricted its wide-scale use.

The third method is the use of industry standards. Standards such as MPEG-7, MPEG-21 and HTML-5 attempt to enrich the online video experience by enabling search, sharing and enhanced display of key information in content. The popularity of MPEG-7 and MPEG-21 has been limited as they do not address the fundamental issue of key information extraction from content. Instead, these standards provide a mechanism to query and share information between devices. HTML-5 has gained noticeable attention in the press recently. It proposes a major revision to the video tag that enables dynamic and interactive access to playback content shown on a browser. Video window orientation, coloring, edge effects, and trick-mode controls are some of the effects proposed by the standard. HTML-5 may be exceptional as it holds promise for enhancing the online video experience through its rich graphics operations and audio/video effects.

To recap, free content requires the addition of metadata such as key frames, scene classification, and summarization etc. to mirror the rich video experience offered by premium content. However, unlike premium content, it is unrealistic to expect this data to be generated by the user and tagged onto the stream. In order to be a viable option, the data needs to be generated in real-time, requiring only modest computing resources. Current approaches discussed above fail to meet this requirement due to various factors. Audio and video analysis techniques may have the power to create the metadata, but due to its complexity, computing resources far exceeding capabilities on consumer media devices are required. Additionally, these techniques are not real-time, thus being best suited for offline creation. Codec technologies have demonstrated their ability to embed key metadata into the stream during the encoding process. However, encoding complexity and the lack of supporting decoders/players limit their use. Industry standards including HTML-5 do not provide a comprehensive solution either, as they fail to address the core issue of meta data creation.

This patent application describes a solution to these challenges.

SUMMARY OF THE EMBODIMENTS

Systems, methods, and computer program products for performing automated analysis of multimedia data are disclosed and claimed herein. Downloaded or streaming movies or video clips may be analyzed to identify action scenes, calm scenes, and probable transition points based on audio loudness and video motion levels as a human probably would. An index or menu may then be created based on consumer preferences, and used to play interesting scenes, produce customized trailers, or edit and tag movies with metadata as desired. The results may be sent to visual search engines for further search, used to replace commercial messages, or shared via social networks. Embodiments may also categorize and cluster user-selected input by content features.

Exemplary embodiments receive multimedia data, identify at least one multimedia data portion having specified content features, and responsively output at least one identified multimedia data portion. Metadata is also generated for the multimedia data. The analysis preferably occurs in real time, and may be performed by a resource-limited consumer application, such as a media player plug-in tool. The analysis may include performing heuristics based on human perception.

In one embodiment, the analysis operates on a subset of frames based on time division or a group-of-pictures boundary. The analysis may include converting speech to text and/or performing facial recognition. The analysis may operate on video features including (a) compressed domain motion vectors and location distributions, (b) compressed domain macro block sizes and corresponding distributions and block types and corresponding locations, (c) compressed domain frame types, and/or (d) raw color histograms and associated statistics. The analysis may also operate on audio features including (a) RMS power of a sampled audio frame, (b) spectral centroid calculated via a short term Fourier transform, and/or (c) short-term MFC power spectrum representation on a nonlinear Mel scale frequency.

The analysis may identify action scenes as multimedia data portions having elevated audio levels and/or elevated motion vector magnitudes. Action scene identification may further comprise selecting a subset of P frames having elevated motion vector magnitudes, then for each selected P frame, decoding the corresponding audio frame, computing an RMS power value for the corresponding audio frame, and finally selecting audio frames having the highest RMS power value.

The analysis may also identify low-motion scenes as multimedia data portions having both largest adjacent macro blocks and smallest motion vector magnitudes. Low-motion scene identification may further comprise selecting a subset of P frames, then for each selected P frame, extracting macro blocks and motion vectors, determining macro block sizes and motion vector magnitudes, and finally selecting P frames having the largest adjacent macro blocks and the smallest motion vector magnitudes.

The analysis may identify preview points as multimedia data portions having wider color distributions. Preview point identification may further comprise dividing the multimedia data into non-overlapping sections, then for each section, extracting three equally spaced candidate frames, computing a color histogram for each candidate frame, and finally selecting the candidate frame with the largest standard deviation. The analysis may also treat MFCCs as feature vectors and responsively identify multimedia data portions having at least one of human dialogue and music.

The multimedia data may include audio content, video content, compressed multimedia data, uncompressed multimedia data, downloaded data, streaming data, online data, and/or free data. The identified portion may include an audio clip, a video image, and/or a video clip. Embodiments of the invention further generate metadata corresponding to the analysis.

Alternate embodiments may output a collection of identified multimedia data portions, where the collection may includes an index, a set of video clips, a set of video images, and/or a set of audio clips. The embodiments may further tag the collection with metadata, and display the collection in a graphical user interface such as in a DVD menu.

Embodiments may also categorize and/or cluster a set of user-selected multimedia data portions by content feature. A playback sequence corresponding to a sequence of content features defined by a user may also be created, tagged, cropped, mixed, and saved. The playback sequence may be used to replace at least one advertisement, may summarize a surveillance video, and may comprise a user-customized movie trailer. The playback sequence may be used on a DVD as an introduction, a menu transition sequence, a chapter, and/or a special feature.

Further embodiments may output an identified multimedia data portion to a social network and/or a visual search engine. Collections of multimedia data portions such as an index, a set of video clips, a set of video images, and a set of audio clips may be shared through the social network. Additional multimedia data items having specified content features may be identified by the visual search engine and output and/or added to a collection.

Enhanced embodiments for further automated analysis of multimedia data comprise receiving multimedia data, identifying at least one multimedia data portion having a target audio content feature, recognizing at least one aspect of the identified feature, and responsively outputting an indication of the aspect. As with other embodiments, the analysis may occur in substantially real time, be performed by a resource-limited consumer application, and operate on audio features including the RMS power of a sampled audio frame and/or short-term MFC power spectrum representation on a nonlinear Mel scale frequency. The multimedia data may again include audio content, video content, compressed multimedia data, uncompressed multimedia data, downloaded data, streaming data, online data, and/or free data, and the identified portion may be an audio clip, a video image, and/or a video clip. Metadata corresponding to the analysis may also be generated.

In the enhanced embodiments, the target audio content feature may include human dialogue, laughter, animal sounds, and/or location specific sounds. For human dialogue, the aspect may be the name of a speaking actor and/or the name of a speaking character. The aspect may be recognized by comparing the identified portion with a set of voice samples to find at least one best matching sample, then the speaker name and/or character name are output. The comparison may include representing a voice sample as one of a MFC coefficient vector or other feature vector, then computing a Euclidean distance or a correlation measure from the representation, and outputting at least one best matching sample in probability order, where the best matching samples have a low Euclidean distance and/or a high correlation measure. A minimum difference threshold may also be applied to reject non-matching samples.

Further, the enhanced embodiments may target human dialogue and recognize aspects such as words and their corresponding time-stamps by selectively converting speech to text if the word is not in text form, selecting the most meaningful content words, and outputting the selected words and their corresponding time-stamps. The enhanced embodiments may also find additional multimedia data related to the indication with a directed search. The additional multimedia data may be pre-fetched in anticipation of user interest. The additional multimedia data may include related movies, current movies, movie previews, current events, a biography, a filmography, related advertisements, information on recognized locations, and/or a scene characterization. User verification of the indication may be stored and used to improve recognition accuracy by incorporating prior recognitions.

As described more fully below, the apparatus and processes of the embodiments disclosed permit automatic analysis of multimedia data. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

BRIEF DESCRIPTION OF THE DRAWINGS

FIG. 5 depicts a flowchart according to an embodiment;

DETAILED DESCRIPTION OF EXEMPLARY EMBODIMENTS

This patent application introduces the VideoLens Media Engine, a real-time scene search engine that delivers meaningful visual information that can enrich the online viewing experience. The VideoLens engine may be implemented in an interactive media player application for the Sony SNAP framework for example. Developers may leverage the engine to add new and exciting online video features into their applications running on audiovisual devices.

The engine performs an automated analysis of received multimedia data by identifying and outputting portions having specified content features. Content features thus enable input data to be categorized or clustered. Embodiments of the present invention encompass the following primary design choices:

1. A heuristic approach to the design of algorithms based on human perception. For example, loud sounds typically accompany action scenes. Frames with a larger distribution of colors are generally more interesting than others.

2. A combined or multi-modal analysis of audio and video data. Human brains use vision and sound collectively. Note that a majority of academic work in this area of the art uses either video or audio, but not both.

3. Algorithm speed and simplicity is emphasized over strict accuracy of generated metadata. Algorithms should be able to run on a resource-limited consumer media device, preferably in real time.

Figure 1:
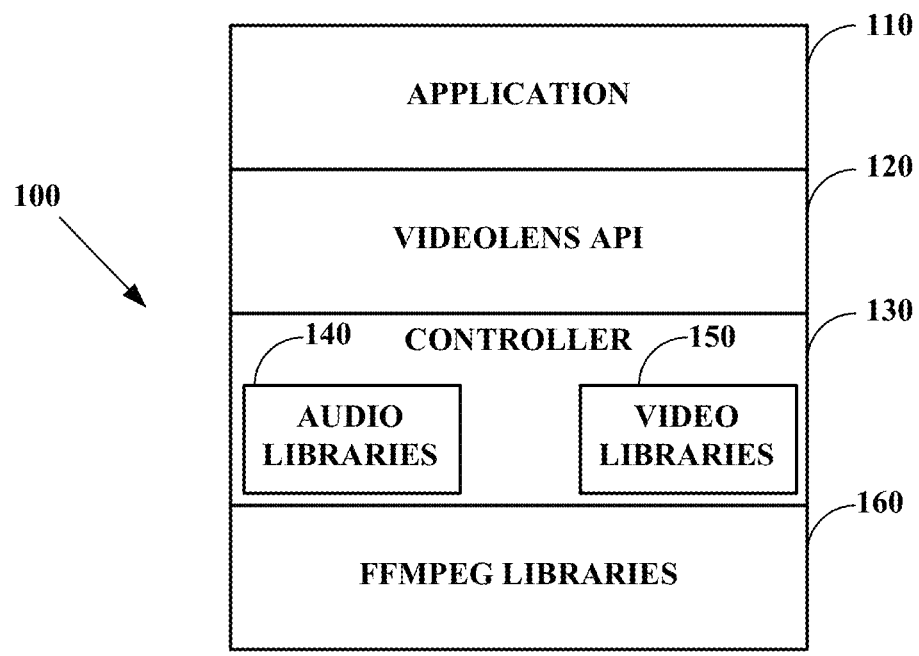
FIG. 1 depicts a block diagram of the software architecture of embodiments of the present invention.

Referring now to FIG. 1, a block diagram of the software architecture of embodiments of the present invention is shown. The Video Lens Media Engine 100 is built on top of the FFMPEG open-source software package. FFMPEG is a cross-platform package that supports audiovisual recording, encoding, decoding and streaming functions. Over one hundred software applications 110 such as media encoders and decoders, and thousands of streaming servers are based on FFMPEG.

A customized "lite" version of the FFMPEG package with support for streaming and audio/video decoding functions forms the base layer 160. This "lite" customization enables reducing the size of the package to under 2 MB (a 90% reduction of the standard package) and makes it suitable for flash and memory constrained consumer media devices. This layer forms the data layer of the system.

The video and audio algorithm libraries 140 and 150 reside above the FFMPEG layer 160. These libraries contain algorithms developed to support the scene search capability of the engine. These algorithms operate on the data provided by the FFMPEG layer and are controlled by the Controller layer 130. Details of these algorithms are provided below.

The Control layer initiates and manages the parallel operations of the FFMPEG layer and audio/video algorithm libraries. Based on the request received from the application (via an application program interface or API 120), it directs the FFMPEG layer to perform streaming operations to obtain the stream. Additionally, the Control layer selects the appropriate audio and video algorithms to perform the API task. It provides decoded or compressed data to the algorithms based on their types. The combined output of the audio and video algorithms are passed back to the requested API as an array of video frames corresponding to the search query.

The engine is portable among many hardware platforms due to the portability of FFMPEG that forms its base layer. Its capabilities can be enhanced over time via the addition of new search methods to its algorithm library.

Scene Search Capabilities

Examples of scene search results obtained from the Video-Lens engine are provided below.

Figure 2A:
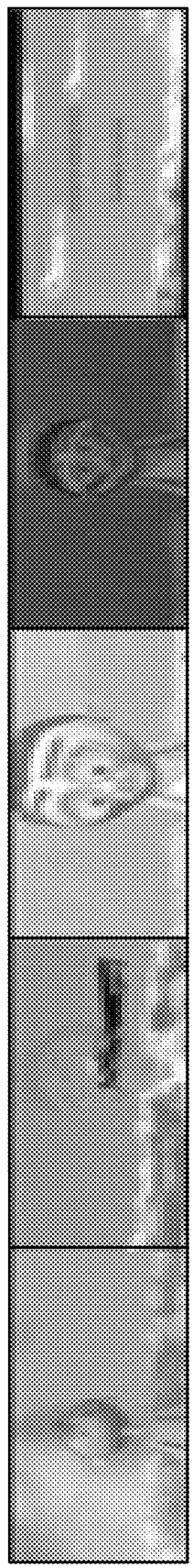
FIG. 2A depicts detection of action frames according to an embodiment.

1. Action Scenes (FIG. 2A depicts action frames detected in the "realitybites" mp4 stream. These frames contain objects that are in motion.)

Figure 2B:
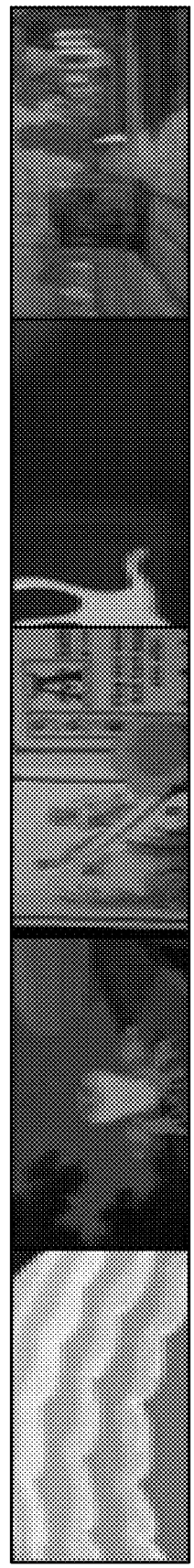
FIG. 2B depicts detection of low motion frames according to an embodiment.

2. Low Motion Scenes (FIG. 2B depicts low motion frames detected in the "princess-and-frog" mp4 stream. These frames had very little motion.)

Figure 2C:
FIG. 2C depicts detection of preview frames according to an embodiment.

3. Previews/Chaptering (FIG. 2C depicts preview frames of the "Up" mp4 stream. Frames are equally spaced in the stream, and have a standard deviation of its histogram that exceeds a threshold.)

4. Human Dialogue and Music Scenes

Algorithm Details

The scene search capabilities of the VideoLens Media Engine are driven by its core audio and video algorithms. These algorithms are designed heuristically based on human perception properties. The inputs to the engine are typically video files, often free videos available online via download or streaming; however audio files may also be processed. Compressed or uncompressed multimedia data may be input. The output is typically a series of frames corresponding to the respective search query, but may also include an audio clip or a video image.

The video algorithms may operate on compressed and decoded video features, specifically:
1. Compressed domain motion vectors and distribution—Motion vector magnitude and locations.
2. Compressed domain macro block sizes and distribution—Block types and locations.
3. Compressed domain frame type—Intra (I), Predicted (P) and Bidirectional (B).
4. Raw color histogram and associated statistics.

Note that motion vectors and macro block types are compressed domain information. Their utilization provides the VideoLens engine with a number of distinct advantages. First, these features are generated during the encoding process. Therefore, the computational cost to acquire them is very small (limited to parsing the compressed stream). Second, these features relate directly to a physical characteristic of the video and therefore convey important information to the extraction algorithm.

Similar to its video counterpart, audio algorithms operate on a simple feature set that can be computed from the audio data in an efficient and resource-lite manner:
1. Power—RMS value of an audio frame of 512 samples.
2. Spectral Centroid—Center of mass of the spectrum as calculated via the short term Fourier transform.
3. Mel-Frequency Cepstrum (MFC) Spectral coefficients—representation of short-term power spectrum of a sound on a nonlinear Mel scale frequency. The Mel scale approximates the human auditory system's response more closely than linearly spaced frequency bands. MFC are commonly used as features in speech recognition systems.

(Further detail on enhanced embodiments for audio-based multimedia analysis are provided later on, regarding FIGS. 6 and 7).

The algorithms below have a pre-analysis component that extracts a subset of candidate frames from the stream. Working with a subset of frames is important to meet the real-time operation requirement. The frames are chosen based on a time division or a group-of-pictures (GOP) boundary.

Action Scene Detection

Action scenes are detected based on audio signal amplitudes and motion vector magnitudes. The relevant premise is that most action scenes usually have elevated sound accompanying them:
Select a subset of Predicted (P) frames from the stream based on time or GOP boundaries.
For each selected frame:
  Decode the corresponding audio frames. Audio frames are associated via their PTS value to the selected frame.
  Compute the RMS value for each audio frame.
  Select frames that have the highest RMS value.
For each selected frame:
  Extract the motion vectors.
  Action frames will be those that have the largest co-located motion vector magnitudes.

Figure 3A:
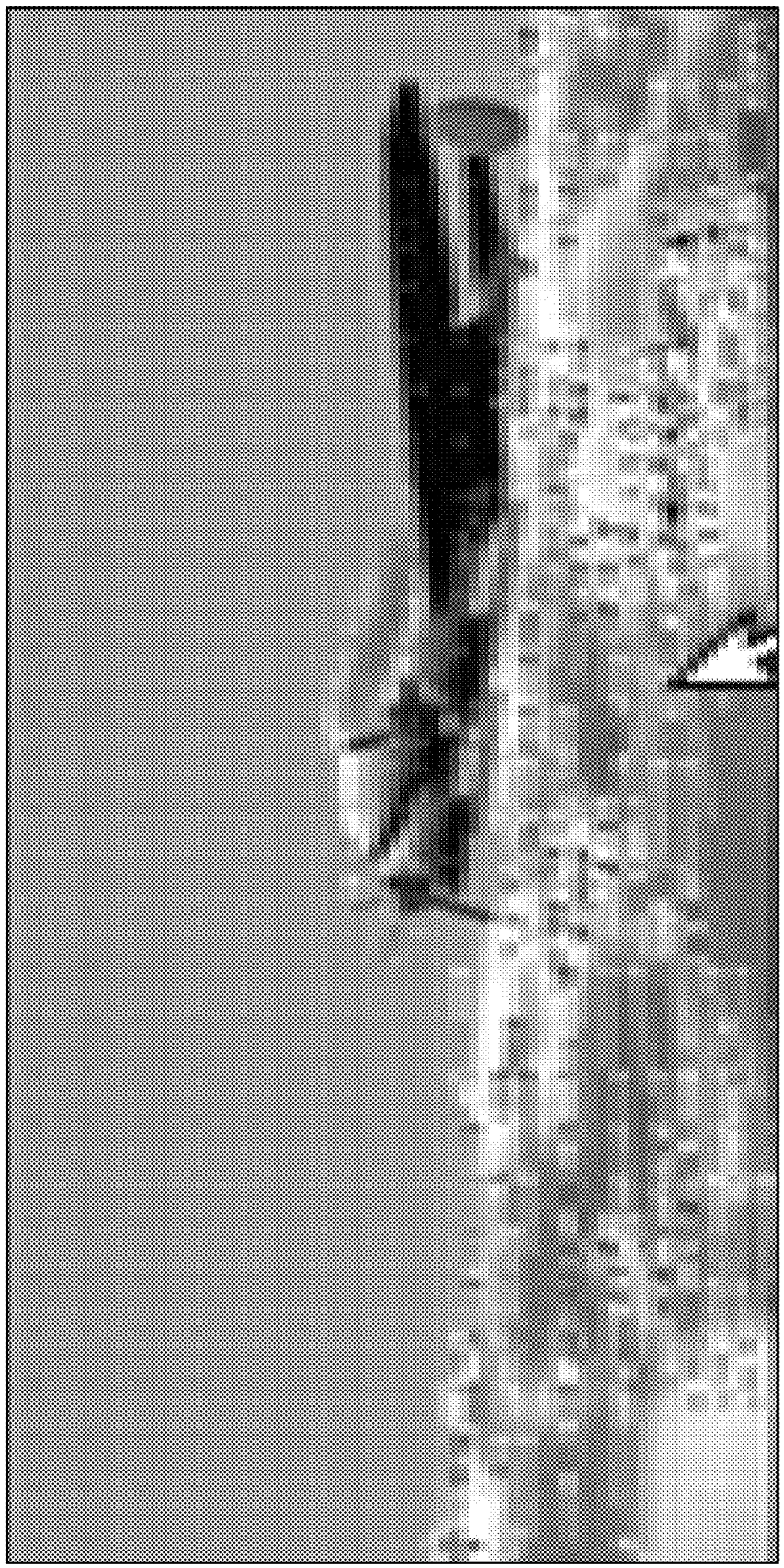
FIG. 3A depicts frames with overlaid motion vectors according to an embodiment.

This algorithm can be adapted to function on streams with no audio by considering only motion vectors. FIG. 3A depicts some frames with overlaid motion vectors. The motion vectors are mapped on the action frame. Note the motion vectors are located around the aircraft and clouds. The sound of the aircraft accompanied the frame sequence.

Low Motion Scene Detection

Figure 3B:
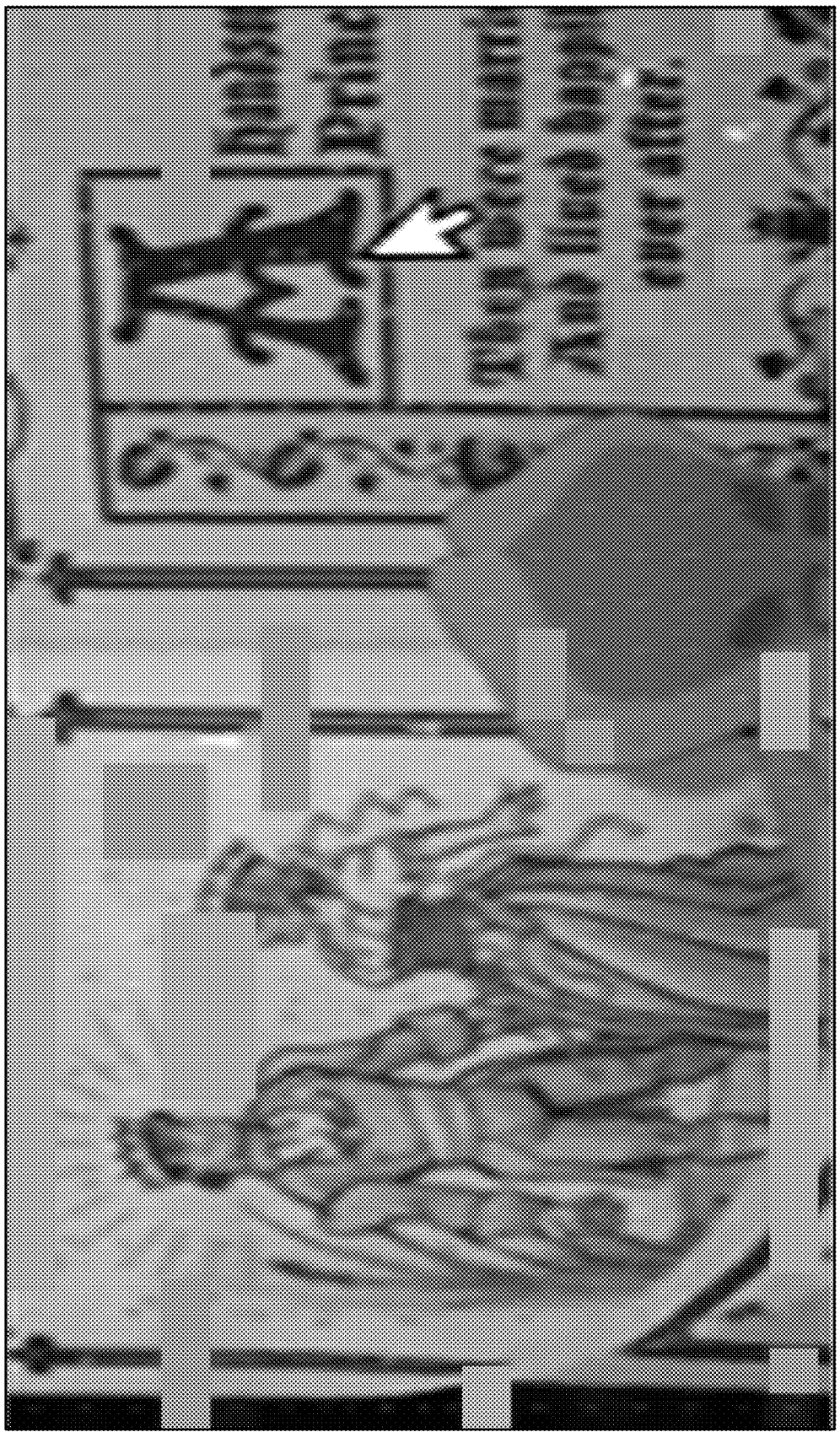
FIG. 3B depicts motion vectors and macro block sizes mapped to a frame according to an embodiment.

Low motion scenes are detected by analyzing macro block sizes and motion vector magnitudes. (FIG. 3B depicts that motion vectors and macro block sizes are mapped to the frame. The rectangles correspond to 16×16, 16×8, and 8×16 macro blocks. Notice the absence of motion vectors.) The relevant premise is that low motion scenes contain large adjacent areas of the picture (macro blocks) that have little motion:
Select a subset of Predicted (P) frames from the stream based on time or GOP boundaries.
For each selected frame:
  Extract Macro-blocks and motion vectors.
  Determine size of macro-block. Magnitude of motion vectors.
  Low motion frames will be those that have the largest adjacent macro blocks with the smallest motion vector magnitudes.

Preview/Chaptering Creation

This method selects key frames from the stream that represent a preview of content. It is based on the premise that frames with a wider distribution of colors (as measured by a histogram) contains more information (and therefore, are more interesting) than ones with a narrow distribution:
Divide the stream into non-overlapping sections.
For each section:
Extract three candidate frames that are equally spaced.
Compute the histogram for each candidate frame.
Select the frame with the largest standard deviation.

Figure 3C:
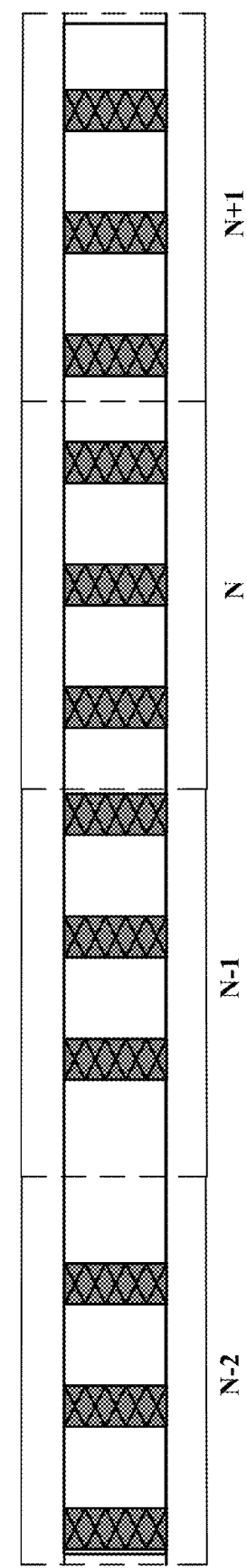
FIG. 3C depicts selection of preview frames based on color distribution according to an embodiment.

The non-overlapping sections are shown in FIG. 3C (duration/N) where N is the number of preview frames. For each section, three equally spaced candidate frames are selected. An illustration of the candidate obtained per section is shown. Four non-overlapping sections of the content (n−2 to n+1) result. Three candidate frames are obtained per section.

Human Dialogue and Music Scene Detection

These algorithms are based on the analysis and classification of audio samples using their Mel Frequency Cepstrum Coefficients (MFCC). The MFCC provides a good model of the human auditory system. MFCC is used extensively in audio recognition systems. The MFCC coefficients may be used as feature vectors to detect the presence of human dialogue and/or music.

Exemplary Implementation—SNAP Media Player

The VideoLens Media Engine enables multimedia applications to provide a rich online video experience to the user. This is especially true and valuable for free online content. Applications accomplish this by using the real-time scene search capabilities of the engine to create snapshots of frames. These frames can be used and presented in new and interactive ways to the user.

SNAP or Sony Networked Application Platform is an application framework for Sony devices. It provides a complete eco-system for third-party application developers to develop and deploy (and monetize) their applications on Sony devices running SNAP. Given that most Sony devices are audiovisual related, SNAP provides an ideal environment to showcase the benefits of the VideoLens Media Engine.

The media player within the SNAP system was chosen as the application to utilize the VideoLens Media Engine. The VideoLens Engine is provided as a objective C-based library to the player. The use of the engine enables the SNAP media player to provide a rich interactive media experience that extends beyond the traditional media player. For example, through the options panel, a user may be able to query the player to provide a snapshot (in terms of frames in the video) of scenes that correspond to action, still, preview, human dialogue or music scenes. The frames corresponding to the individual scene category are displayed horizontally at the lower section of the player. The user may skim through these using touch swipe gestures for example. Additionally, the user may customize the playback scene by selecting one or more frames to play. These frames will be played back by the media player engine in the selected order. Collectively, these real-time functions enhance the viewing experience of content, especially true for free online content.

For example, a user can produce a customized DVD with the selected frames or sections found by the engine for example, to produce a DVD menu, an introductory DVD video clip, a DVD menu transition sequence, a DVD chapter, and a DVD special feature (e.g. an interview or documentary). A customized movie trailer may be assembled from a selected feature playback sequence. Further, a selected playback sequence may replace advertisements or summarize a surveillance video.

Figure 4A:
FIG. 4A depicts a screen capture of a functional prototype media player according to an embodiment.

FIG. 4A depicts a screen capture of a functional prototype media player for SNAP. The vertical column provides a list of options. The horizontal row shows selections corresponding to the chosen option (in the vertical column). The screen capture displays the scene search selections available for the VideoLens option. Note that the final look and feel of the player will be determined by graphical user interface employed.

Figure 4B:
FIG. 4B depicts a generated frame according to an embodiment.
Figure 4C:
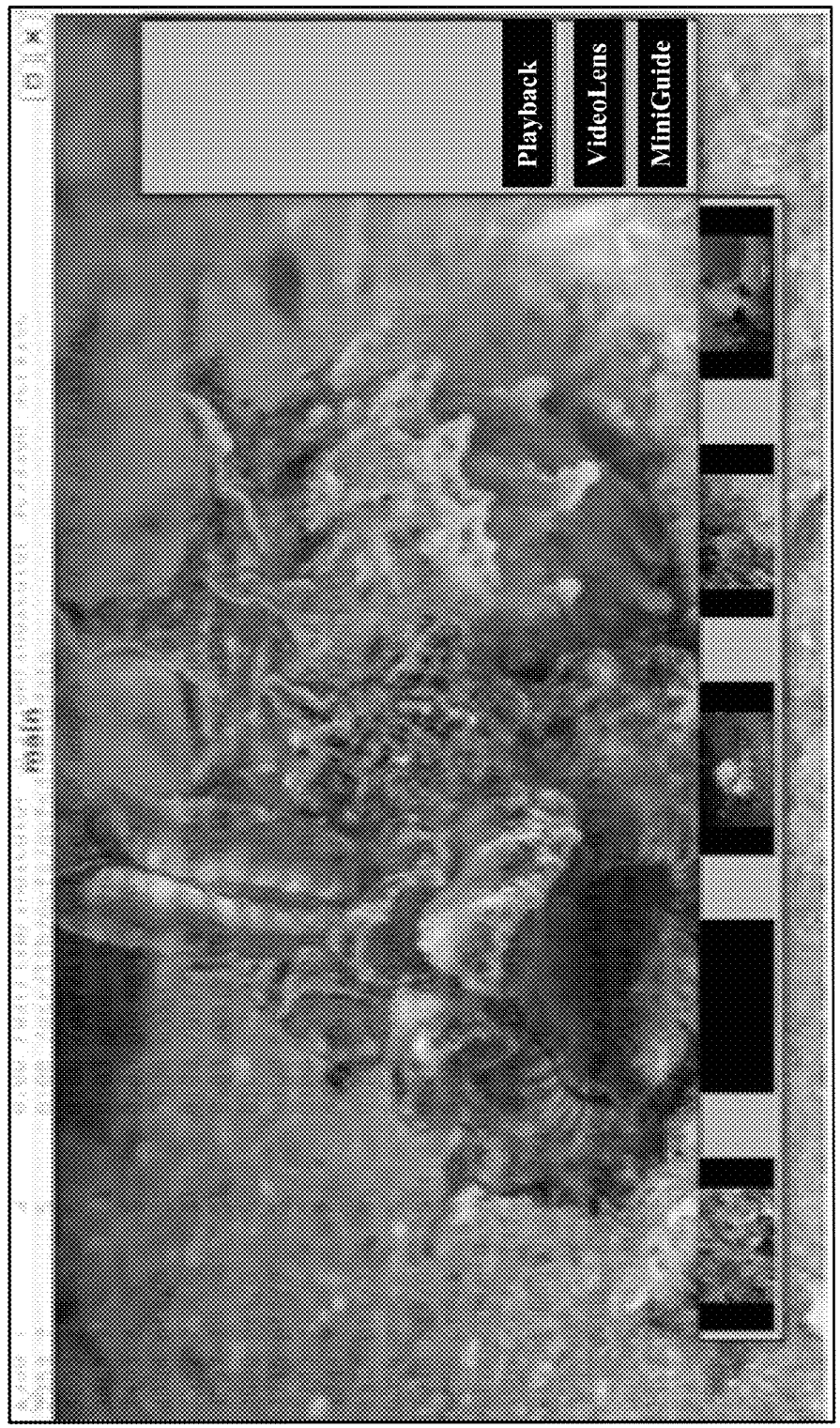
FIG. 4C depicts another generated frame according to an embodiment.

FIGS. 4B and 4C depict frames generated by the VideoLens engine, which are displayed at the bottom of the player. The user can browse through these frames by swiping or highlighting one or more frames to begin customized playback of those particular highlighted sections. Note that the main playback sequence is not disrupted by the engine.

Applications Enabled

The VideoLens engine can be leveraged to develop a number of exciting multimedia applications that interact with online video. Some examples are:
1. Media Player Enhancement—Scene search and display, visual seeking and playback, sharing across social networks.
2. Social Network Applications—Quick browsing of content, tagging and sharing.
3. Visual Search—Key frames found can be forwarded to visual search engines like the Google Goggles™ application to generate search results related to the frame. ("Goggles" is a registered trademark of Google Inc.)
4. Video editing—a collection of the sections of the video as defined by the frames can be cropped, mixed, tagged with metadata, and saved.
5. Automated Metadata generation—based on the matching content found.

Referring now to FIG. 5, a flowchart of the general operation of a full embodiment 500 is shown. In this embodiment, numerous content feature target aspects are shown, as may result from a complex user query. However, it may be appreciated that not every step shown will be required for simpler user queries, so that the embodiment may complete its tasks faster. In step 510, the user query and multimedia data are input. The user query may specify a desire to find action scenes, low motion scenes, previewing frames, dialogue/music scenes, and/or to have metadata on each content feature aspect automatically generated. The user may also specify further actions to be taken once the output is generated.

In step 520, the embodiment selectively finds action scenes based on high audio levels (if available) and high magnitude motion vectors, should the user query indicate an interest in action scenes. In step 530, the embodiment may selectively find low motion scenes based on large adjacent macro blocks and low magnitude motion vectors. In step 540, the embodiment may selectively find previewing frames based on the standard deviation of color histograms taken from sampled candidate frames. In step 550, the embodiment may selectively find dialogue and music scenes based on MFCC coefficients used as feature vectors.

In step 560, the portions of the multimedia data matching the user query are output, along with automatically generated metadata as specified. The embodiment may stop at this point, play back the output portions, forward them onto visual search engines to find further matching material and/or share the output portions and additional matching material and metadata as described above.

Figure 6:
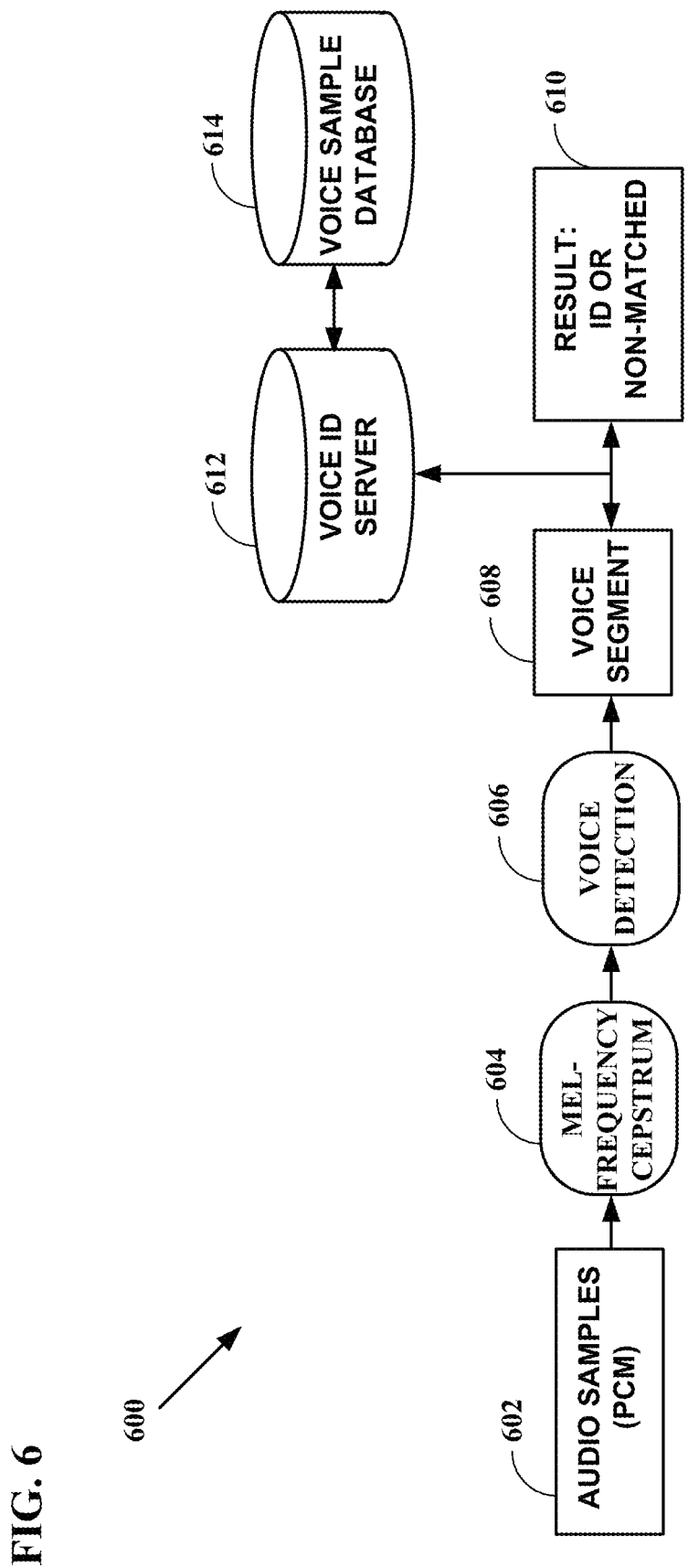
FIG. 6 depicts a flowchart according to an embodiment.
Figure 7:
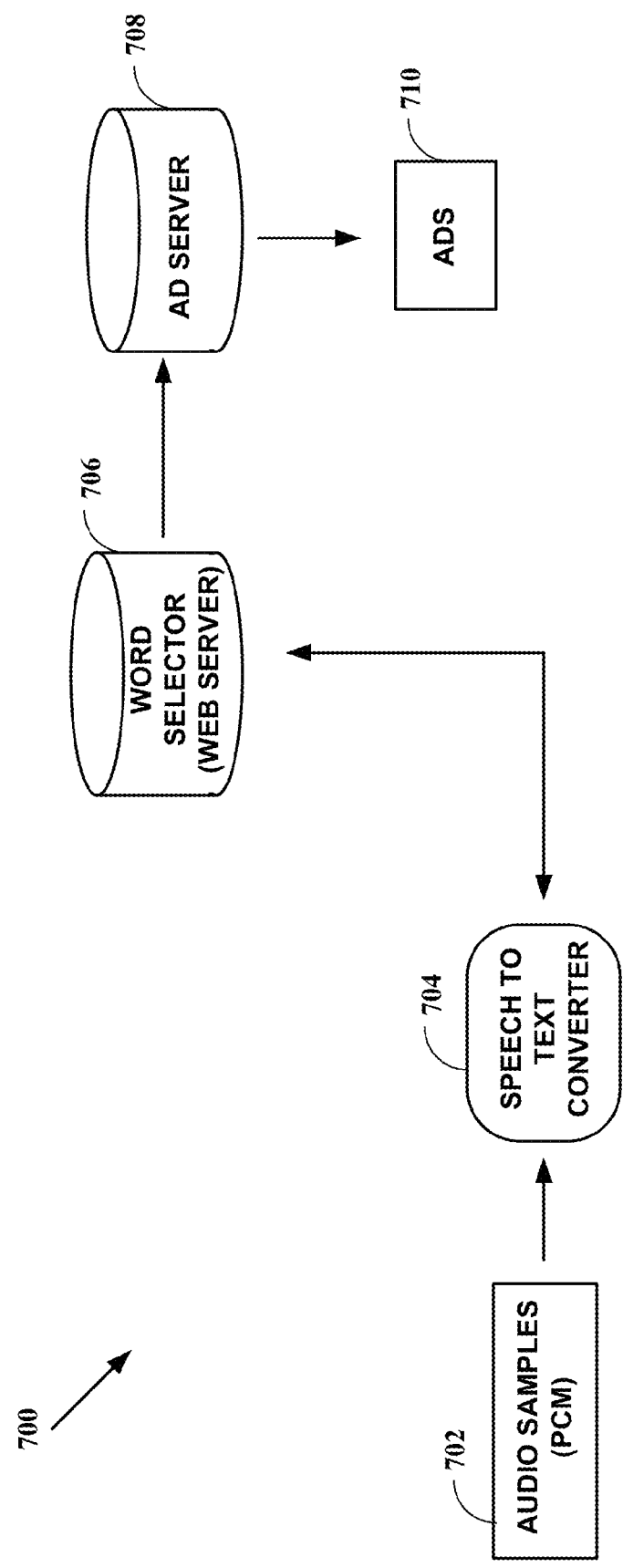
FIG. 7 depicts a flowchart according to an embodiment.

Enhanced embodiments for further automated analysis of multimedia data based on audio content are now described with respect to FIGS. 6 and 7. FIG. 6 depicts an embodiment directed to recognition of a particular voice, while FIG. 7 depicts an embodiment directed to recognition of particular words that determine further processing.

As shown in FIG. 6, embodiment 600 receives multimedia data (typically audio samples in PCM format) in step 602. The audio content may be represented as shown in step 604 as a MFC coefficient vector or similar audio feature vector representation that minimizes the effect of background noise and audio power levels. Next, the target audio content feature (which may include human speech or dialogue for example) is identified; for example, in step 606 the portions of multimedia data that are voice segments are located and separated in step 608 for further processing. The voice segments are then presented to a voice ID server in step 612 for possible recognition of at least one aspect of interest. In the enhanced embodiments, the target audio content feature is typically human dialogue, but may also include laughter, animal sounds, and/or location specific sounds.

As with other embodiments, the analysis may occur in substantially real time, be performed by a resource-limited consumer application, and operate on audio features including the RMS power of a sampled audio frame and/or short-term MFC power spectrum representation on a nonlinear Mel scale frequency. The multimedia data may again include audio content, video content, compressed multimedia data, uncompressed multimedia data, downloaded data, streaming data, online data, and/or free data, and the identified portion may be an audio clip, a video image, and/or a video clip. Metadata corresponding to the analysis may also be generated.

For human dialogue, the aspect may be the name of a speaking actor and/or the name of a speaking character for example. The aspect may be recognized by comparing the identified portion (e.g. voice segment) with a set of voice samples in a voice sample database 614 to find at least one best matching sample. The aspect is then output if a match is found, in step 610. The comparison may include representing a voice sample as a MFC coefficient vector or other feature vector, then computing a Euclidean distance and/or a correlation measure from the representation, and outputting at least one best matching sample. A number of best matching samples may be listed in probability order, where the best matching samples are defined as those having high recognition probability based on a low Euclidean distance and/or a high correlation measure. A minimum difference threshold may also be applied to help reject non-matching samples. Thus, a user may quickly and easily identify a particular actor or speaker or character in multimedia content based solely on audio analysis.

A similar analysis may be performed on animal sounds or location specific sounds from a variety of multimedia data sources. For example, a documentary, reality TV show, or holiday travel video on beach vacations may each include the recognizable sounds of seagulls and crashing ocean waves. Recognition of loud, sudden, violent sounds as may occur in a fight scene, or quiet but recognizable sounds as may occur in a romantic restaurant scene may further aid in scene characterization as previously described.

Further, referring now to FIG. 7, enhanced embodiment 700 may specifically target human dialogue, and recognize aspects such as words and their corresponding time-stamps in the multimedia data. Incoming multimedia data (again typically audio samples in PCM format, but also closed captioning text and other data as previously described) in step 702 is converted from speech to text in step 704 if the incoming data is not yet in text form. The text stream is sent to web server 706 for selection of the most meaningful content words. The selected words and their corresponding time-stamps that help index into an incoming file or stream may help identify multimedia information content in the multimedia data to make subsequent processing easier. For example, in step 708 an ad server can find and output ads 710 that are best correlated to the identified content.

Enhanced embodiments may also use the recognized aspects to find additional multimedia data related to the aspect indication with a directed search. The additional multimedia data may include related movies, current movies, movie previews, current events, a recognized actor's biography, a filmography, information on recognized locations, and/or a scene characterization. Advertisements for goods and services related to the additional multimedia data found may also be presented to a user. This additional multimedia data may be provided on demand, for example when a user selects a "more" menu while perusing multimedia data, or pre-fetched in anticipation of user interest, so that a user will have the data available for perusal without specifically requesting it and waiting for its arrival.

The enhanced embodiments may also learn by experience. User verification of the recognized aspect indication may be stored and used to improve recognition accuracy by incorporating and selectively reinforcing prior recognitions. Thus one user may effectively assist others by providing guidance that updates the relevant databases and decision engines of the embodiments.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A method for automated analysis of multimedia data, comprising:
    receiving of multimedia data from a multimedia software application by a system for automated analysis of multimedia data, the system for automated analysis of multimedia data comprising a media engine configured for multimedia streaming functions, at least one media algorithm library configured for identifying and outputting at least one target audio content feature, a control layer configured for initiating and managing the media engine and the at least one media algorithm library, and an application program interface configured for communication between the multimedia software application and the media engine;
    receiving of a search request from the multimedia software application;
    sending of the search request to the control layer;
    sending of the multimedia data by the control layer to at least one of the at least one algorithm library;
    identifying by the at least one media algorithm library of at least one multimedia data portion having the target audio content feature;
    recognizing by the at least one media algorithm library of at least one aspect of the target audio content feature identified in the at least one multimedia data portion; and
    responsively outputting an indication of the aspect to the application program interface, whereby the indication of the aspect is pre-fetched prior to a user input;

receiving by the multimedia software application of the at least one aspect of the target audio content feature.

2. The method of claim 1 wherein the analysis occurs in real time.

3. The method of claim 1 wherein the analysis operates on audio features including at least one of RMS power of a sampled audio frame and short-term MFC power spectrum representation on a nonlinear Mel scale frequency.

4. The method of claim 1 wherein the multimedia data includes at least one of audio content, video content, compressed multimedia data, uncompressed multimedia data, downloaded data, streaming data, online data, and free data.

5. The method of claim 1 wherein the identified portion is at least one of an audio clip, a video image, and a video clip.

6. The method of claim 1 further comprising generating metadata corresponding to the analysis.

7. The method of claim 1 wherein the target audio content feature is at least one of human dialogue, laughter, animal sounds, and location specific sounds.

8. The method of claim 1 wherein the target audio content feature is human dialogue and the aspect is at least one of the name of a speaking actor and the name of a speaking character.

9. The method of claim 8 further comprising recognizing the aspect by: comparing the identified portion with a set of voice samples to find at least one best matching sample; and outputting at least one of a speaker name and a character name.

10. The method of claim 9 wherein the comparing comprises: representing a voice sample as one of a MFC coefficient vector and a feature vector; computing at least one of a Euclidean distance and a correlation measure from the representation; and outputting at least one best matching sample in probability order having at least one of a low Euclidean distance and a high correlation measure.

11. The method of claim 10 further comprising applying a minimum difference threshold to reject non-matching samples.

12. The method of claim 1 wherein the target audio content feature is human dialogue and the aspect includes a word and corresponding time-stamp.

13. The method of claim 12 further comprising recognizing the aspect by: selectively converting speech to text if the word is not in text form; selecting the most meaningful content words; and outputting the selected words and their corresponding time-stamps.

14. The method of claim 1 further comprising:
storing user verification of the indication; and
improving recognition accuracy by incorporating prior recognitions.

15. A system for automated analysis of multimedia data, comprising:
a processor, the processor comprising a media engine configured for multimedia streaming functions, at least one media algorithm library, a control layer, and an application program interface, the processor configured to:
receive multimedia data from an multimedia software application;
receive a search request from the multimedia software application, the search request including a target audio content feature;
identify at least one multimedia data portion having the target audio content feature;
recognize at least one aspect of the target audio content feature identified in the at least one multimedia data portion; and
responsively output to the FFMPEG application an indication of the aspect, whereby the indication of the aspect is pre-fetched prior to a user input.

16. A computer program product comprising a non-transitory machine-readable medium tangibly embodying program instructions thereon that, when executed by a computer, cause the computer to:
receive multimedia data from an multimedia software application;
receive a search request from the multimedia software application, the search request including a target audio feature;
identify at least one multimedia data portion having the target audio content feature;
recognize at least one aspect of the target audio content feature identified in the at least one multimedia data portion; and
responsively output to the multimedia software application an indication of the aspect, whereby the indication of the aspect is pre-fetched prior to a user input.

* * * * *